United States Patent [19]

Moss

[11] Patent Number: 4,998,906
[45] Date of Patent: Mar. 12, 1991

[54] TOOTH BELT DRIVE, ESPECIALLY FOR INTERNAL COMBUSTION ENGINES

[75] Inventor: Hans Moss, Hovås, Sweden

[73] Assignee: AB Volvo, Gothenburg, Sweden

[21] Appl. No.: 424,404

[22] Filed: Oct. 10, 1989

[30] Foreign Application Priority Data

Oct. 10, 1988 [SE] Sweden .................... 8803589

[51] Int. Cl.⁵ .................... F16H 5/20; F16H 55/02
[52] U.S. Cl. ............................... 474/153; 474/205
[58] Field of Search ............... 474/152, 153, 204, 205

[56] References Cited

U.S. PATENT DOCUMENTS

| | | | |
|---|---|---|---|
| 3,583,250 | 6/1971 | Kongelka | 474/153 X |
| 3,996,812 | 12/1976 | Cappotto et al. | 474/153 |
| 4,264,314 | 4/1981 | Imamura | 474/205 |
| 4,416,649 | 11/1983 | Kohrn | 474/153 |
| 4,545,778 | 10/1985 | Koivula | 474/153 |
| 4,571,224 | 2/1986 | Arinaga | 474/153 |

Primary Examiner—Thuy M. Bui
Attorney, Agent, or Firm—Young & Thompson

[57] ABSTRACT

A tooth belt drive has tooth pulleys (5) with evenly distributed interruptions (22) in its teeth to temporarily interrupt the force excitation from the pulleys and to reduce the oscillation amplitude of the free parts of the belt between the pulleys.

8 Claims, 2 Drawing Sheets

TOOTH BELT DRIVE, ESPECIALLY FOR INTERNAL COMBUSTION ENGINES

The present invention relates to a tooth belt drive, comprising at least one driving and at least one driven pulley and a tooth belt running about the pulleys.

When transmitting torque from a driving shaft to one or more driven shafts, belt drives of various types are often used. When relatively high torques are to be transmitted or when the relative angular positions of the driving shaft and the driven shaft must be kept constant, as in the case of the crankshaft and camshaft in internal combustion engines, tooth belt drives are often used running over driving and driven pulleys provided with notches which conform to a greater or lesser degree to the tooth profile of the belt.

In recent years extensive development work has been devoted to optimizing the profile of the teeth for the purpose of reducing noise and extending the life of the tooth belt.

Optimal tooth conformating can however only be achieved for a gear ratio of 1:1; if there are varying pulley dimensions in the drive unit, the conformaty between the teeth and the notches can only be optimized for one pulley diameter, usually the smallest pulley diameter. Despite optimization, non-uniform belt movement does occurs between the pulleys, both longitudinally (i.e. in the primary direction of motion of the belt) and radially relative to the driving pulley.

It is thus not possible by optimization of the tooth and notch profiles to eliminate the so-called polygon effect, which increases with decreasing pulley diameter and gives rise to cyclical variations in the belt velocity causing force variations in the belt and thus in the entire drive unit. The cyclical period is determined by the rotational frequency of one of the pulleys and the number of notches or teeth in this pulley. Between two pulleys the belt has a so-called free part, the dynamic properties of which depend on various factors such as the length of the free part, the materials used, the belt tension etc. In addition to the force excitation from the belt, there are also other force excitations in an internal combustion engine, due to non-uniform rotation of masses and non-uniform combustion pressure as a function of crank shaft angle.

These types of excitations with varying frequencies produce different oscillations in the tooth belt which give rise to a burring in the belt, which can be heard both inside and outside the automobile. Belt burring in the passenger compartment due to sound transmission via the engine mounting is the most serious noise problem. Reduced belt tension can reduce the noise but it also increases the risk of misengagement. Increased belt tension means that the noise will be displaced towards higher rotational speeds. The noise level increases sharply, however, with higher belt tension.

The general purpose of the present invention is to provide a tooth belt drive of the type described in the introduction, which makes it possible to reduce the oscillating amplitude of the sympathetic vibrations in free parts of the belt, thus reducing noise such as burring and increasing the useful life of the tooth belt. A particular purpose of the invention is to provide a tooth belt drive for driving twin cam shafts in an internal combustion engine, which drive unit, despite the appreciable length of the tooth belt, produces a low level of noise.

This is achieved according to the invention by virtue of the fact that either at least one pulley or at least the belt has a series of teeth, which at at least one location has an interruption in its otherwise uniform normal pitch, at which location the pitch between two consecutive operative teeth is at least twice the normal pitch.

By "removing a tooth" in accordance with the invention, i.e. by eliminating the effect of the tooth by removing it completely or partially, the force excitation is temporarily interrupted and the natural damping in the belt and the system produces a lower amplitude for the subsequent oscillations. By adjusting the number of interruptions, the noise generation can be affected so that the level can be reduced by up to 8 decibels.

BRIEF DESCRIPTION OF THE DRAWING

The invention will be described in more detail below with reference to examples shown in the accompanying drawings.

DESCRIPTION OF THE PREFERRED EMBODIMENT

Figure 1:
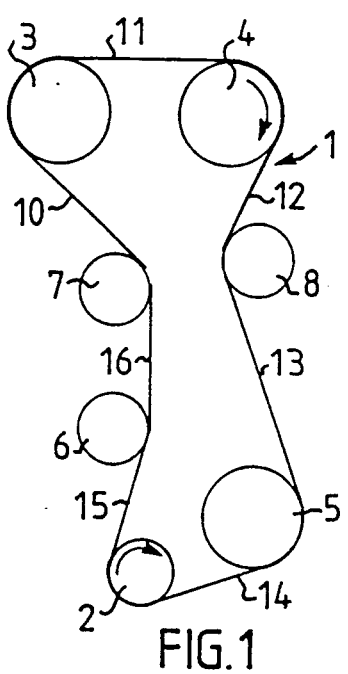
FIG. 1 shows a schematically represented tooth belt drive for an internal combustion engine with twin cam shafts.

In FIG. 1, 1 designates a tooth belt running around a driving first pulley 2 mounted on the crank shaft of an engine, a pair of driven cam shaft pulleys 3 and 4 and a driven pulley 5 on the engine oil pump. Three re-directing pulleys 6, 7 and 8 press against the flat outer surface of the belt 1, at least one of said pulleys serving as a tensioning pulley which is spring (not shown) biased towards the belt. The belt 1 has seven "free parts"-10-16, i.e. parts between tooth pulleys and re-directing pulleys.

Figure 2:
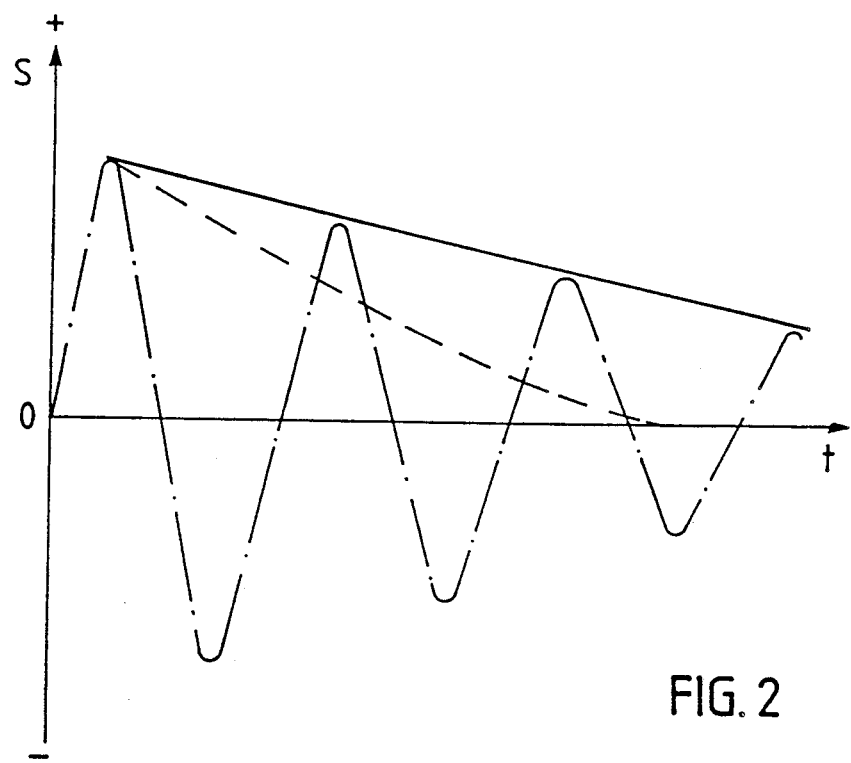
FIG. 2 is a diagram illustrating the reduction of the oscillation amplitude as a function of time for an un--damped and a damped belt.

If a free part between two tooth pulleys is excited by a single pulse, a maximum oscillating amplitude s is obtained at the natural point of resonance of the belt. This amplitude as a function of time t can be as represented in FIG. 2. The solid line in FIG. 2 shows schematically the maximum amplitude as a function of time t for an essentially un-damped tooth belt. For higher material damping (higher loss) a substantially different amplitude curve is obtained, as illustrated by the dashed line in FIG. 2. The oscillation amplitude of a damped belt thus decreases more sharply with time t.

If there is essentially linear periodic excitation with the frequency of excitation corresponding to the natural frequency of the tooth belt, the maximum amplitude increases as a function of time to a value approaching infinity, if there is no damping whatsoever, which means that the belt will rupture. Normally, however, there is always some form of damping in the system. The maximum oscillating amplitude as a function of time is therefore relatively constant as long as the periodic excitation continues, as illustrated by the solid line curve in FIG. 3.

Figure 4:
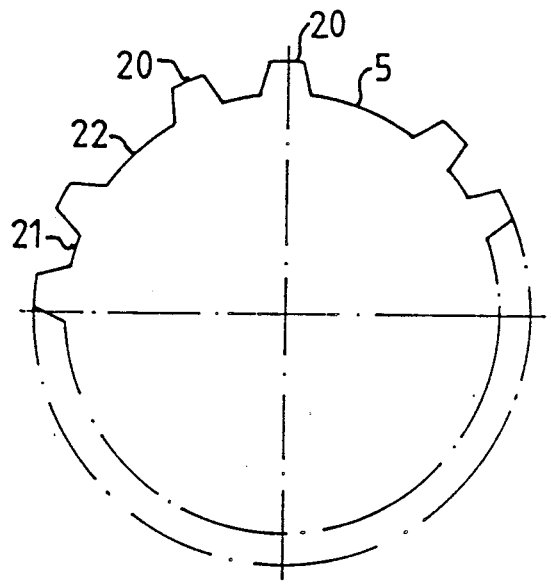
FIG. 4 is a schematic view of a pulley modified in accordance with the invention.

If the excitation is temperarily interrupted by removing a tooth from one of the tooth pulleys in accordance with the invention (FIG. 4) or from the belt (FIG. 5) or by reducing the size of a tooth (FIG. 6) so that it is no longer operative, a lower amplitude is obtained, due to the natural damping of the belt and the system, for the immediately following oscillations, until the system returns to equilibrium with the oscillating amplitude again at its pre-interruption value.

Figure 3:
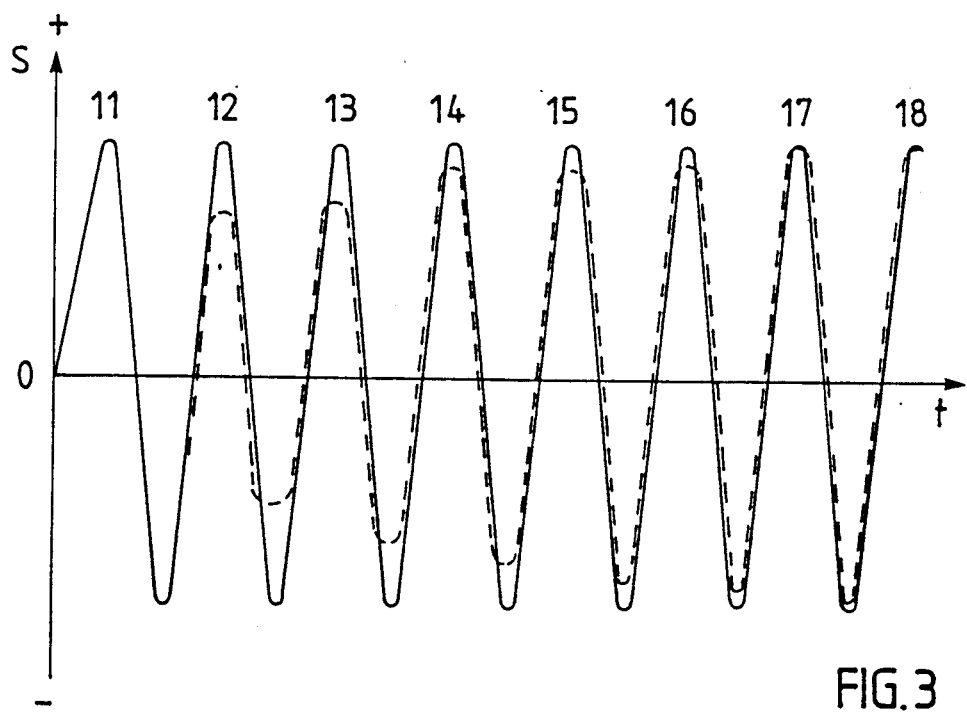
FIG. 3 is a diagram illustrating the oscillating amplitude for a free belt part, when it is excited with a frequency corresponding to its natural frequency and when the excitation is temporarily interrupted by the removal of an operative tooth from one of the pulleys.

In FIG. 3, the dashed line illustrates the oscillation amplitude after an interruption caused by elimination of tooth No. 12 as an operative tooth in pulley 5. A complete return to maximum amplitude is achieved in the example shown at excitation by tooth No. 17. If, for example, every fourth tooth were eliminated as an operative tooth, a maximum oscillation amplitude is achieved which is lower than the amplitude illustrated by the solid line in FIG. 3. How much lower is determined by how powerful the excitation is from the crank shaft pulley 2.

Tests performed with an engine and a drive unit of the type shown in FIG. 1, have demonstrated that when every third tooth 20 on the oil pump tooth pulley 5 is eliminated as an operative tooth, there was a substantially lower oscillating amplitude in the free belt part 14 and a reduction of the noise level of up to 5 decibels. Correspondingly, there was a reduction in the noise level of up to 5 decibels by eliminating every seventh tooth on the crank shaft pulley 2. The measures together produced a noise reduction of up to 8 decibels. The tests also showed a substantial extension of the belt life.

Figure 5:
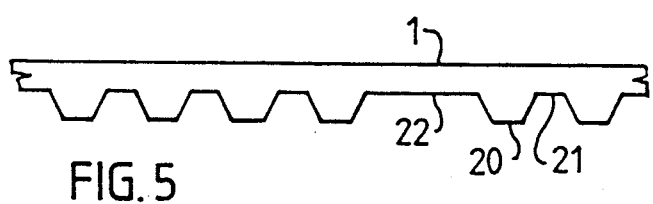
FIGS. 5 and 6 are schematic sideviews of a portion of a tooth belt modified in accordance with the invention.
Figure 6:
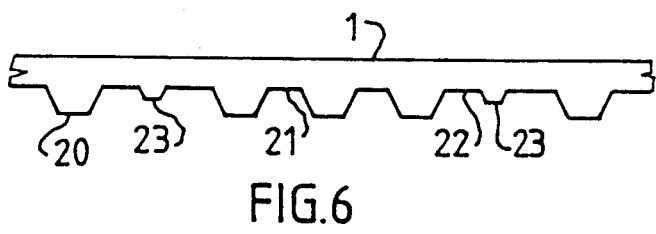

Interruptions in excitation can also be achieved by modifying the tooth belt 1 itself. For example, entire teeth 20 can be eliminated, as shown in FIG. 5, so that, as in the example in FIG. 4, spaces 22 are formed having a length equal to one tooth width 20 and two normal spaces 21. Alternatively, non-operative teeth 23 can be made shorter and with a thinner tooth profile, as shown in FIG. 6.

In a cam shaft drive, it is, however, advantageous to first eliminate the operative teeth on a pulley which is not heavily loaded, such as the oil pump pulley 5 and to leave the belt 1, the crank shaft pulley 2 ad the cam shaft pulleys 3, 4 intact.

The reduction in the burring noise level is determined by the number of operative teeth eliminated on each pulley and/or belt, the number of pulleys modified and the degree of damping in the system, and especially the natural damping of the tooth belt. Tests performed have shown that the number of teeth eliminated should not be fewer than 10%, preferably 15% or more, of the normal total number of teeth. Damping in the belt, measured as a loss factor, should be higher than 3%, preferably appreciably higher, for example 12%.

I claim:

1. Tooth belt drive, comprising at least one driving tooth pulley and at least one driven tooth pulley and a tooth belt running around said pulleys, each of said belt and pulleys having a series of teeth, at least one said series of teeth having at at least one location (22) an interruption in an otherwise uniform normal pitch, at which location the pitch between two consecutive operative teeth (20) is at least twice said normal pitch and the height of the belt or pulley between said two teeth is less than the height of said two teeth.

2. Tooth belt drive according to claim 1, characterized in that said series of teeth has a plurality of said interruptions (22) evenly distributed along its length.

3. Tooth belt drive according to claim 1, characterized in that the number of interruptions (22) is at least about 10% of the number of operative teeth (20) in the series of teeth.

4. Tooth belt drive according to claim 1 characterized in that the series of teeth has interruptions (22) between groups of at least nine operative teeth (20).

5. Tooth belt drive according to claim 1 characterized in that each interruption (22) is formed by completely or partially eliminating a tooth.

6. Tooth belt drive according to claim 5, characterized in that each interruption (22) is formed by reducing the height and width of a tooth in relation to the surrounding operative teeth (20).

7. Tooth belt drive according to claim 1 intended for internal combustion engines with twin cam shafts and comprising a driving crank shaft tooth pulley, two driven cam shaft tooth pulleys and at least one additional driven tooth pulley, characterized in that said interruptions are disposed in the teeth of said additional tooth pulley (5).

8. Tooth belt drive according to claim 7 characterized in that said additional tooth pulley (5) is disposed to drive the engine oil pump and has interruptions (22) between pairs of operative teeth (20).

* * * * *